United States Patent [19]

Fan

[11] Patent Number: 5,226,096
[45] Date of Patent: Jul. 6, 1993

[54] DIGITAL HALFTONING WITH SELECTIVELY APPLIED DOT-TO-DOT ERROR DIFFUSION

[75] Inventor: Zhigang Fan, Webster, N.Y.

[73] Assignee: Xerox Corporation, Stamford, Conn.

[21] Appl. No.: 775,201

[22] Filed: Oct. 11, 1991

[51] Int. Cl.$^5$ .............................. G06K 9/38
[52] U.S. Cl. ..................... 382/50; 358/459; 382/54
[58] Field of Search ............... 382/54, 56, 50, 52; 358/447, 459, 430, 458, 456

[56] References Cited

U.S. PATENT DOCUMENTS

| | | | |
|---|---|---|---|
| 4,339,774 | 7/1982 | Temple | 358/283 |
| 4,651,287 | 3/1987 | Tsao | 358/459 |
| 4,654,721 | 3/1987 | Goertzel et al. | 358/459 |
| 4,668,995 | 5/1987 | Chen et al. | 358/459 |
| 4,727,430 | 2/1988 | Miwa | 358/459 |
| 4,924,322 | 5/1990 | Kurosawa et al. | 358/448 |
| 4,955,065 | 9/1990 | Ulichney | 382/50 |
| 5,008,950 | 4/1991 | Katayama et al. | 382/54 |
| 5,014,333 | 5/1991 | Miller et al. | 382/54 |
| 5,045,952 | 9/1991 | Eschbach | 358/447 |

OTHER PUBLICATIONS

Floyd & Steinberg, "An Adaptive Algorithm for Spatial Greyscale", Proceedings of the SID 17/2, 75-77 (1976).
Jarvis et al., "A Survey of Techniques for the Display of Continuous Tone Pictures on Bilevel Displays", Computer Graphics and Image Processing, vol. 5, pp. 13-40 (1976).
Stucki, "MECCA—A Multiple-Error Correction Computation Algorithm for Bi-Level Image Hardcopy Reproduction", IBM Research Rep. RZ1060 (1981).
Billotet-Hoffmann and Bryngdahl, "On the Error Diffusion Technique for Electronic Halftoning", Proceedings of the SID, vol. 24/3, (1983), pp. 253-258.
"Digital Halftoning on the IBM 4250 Printer", Goertzel et al., IBM J. Res. Develop. vol. 31, No. 1, Jan. 1987.

Primary Examiner—Joseph Mancuso
Attorney, Agent, or Firm—Mark Costello

[57] ABSTRACT

There is provided a method of quantizing pixel values in an image formed by a plurality of pixels, each pixel representing an optical density of the image at a location within the image, and having an original optical density value selected from one of a set of 'c' original optical density values that has a number of members larger than a desired output set of 'd' optical density values through a process of halftoning and error diffusion. An image is processed in accordance with a halftone or dithering process. The resulting halftone dot is compared to a set of legal or full halftone dots, for a determination of whether the dot is a full or partial dot. Partial dots are directed to an output without further processing. For full dots, error occurring in the halftoning process is derived, by comparing the input gray level over the halftone cell, with the output halftone dot. Error derived from previous dot processing, is added to the error derivation, and the level of gray output is varied in accordance with a total error so derived. Error occurring in the output of the full dot is passed to a set of neighboring dots.

8 Claims, 6 Drawing Sheets

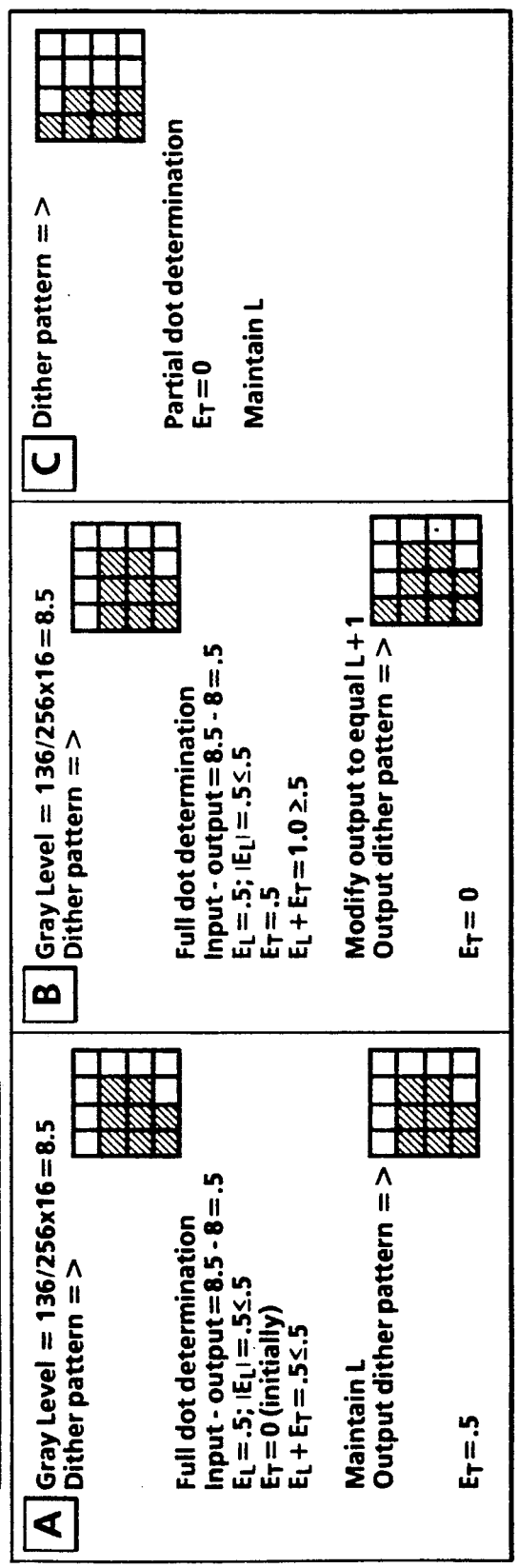
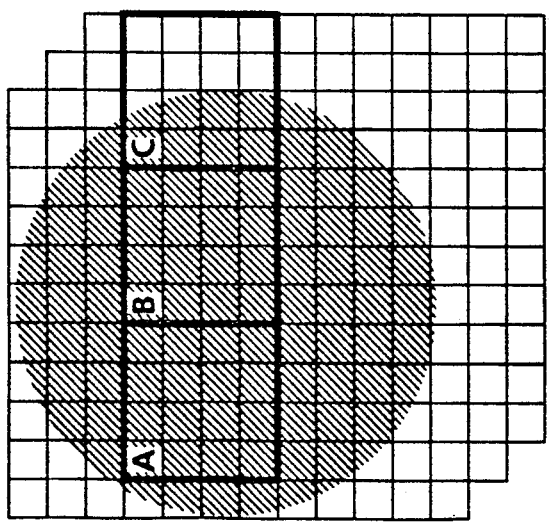
FIG. 6A
FIG. 6B

DIGITAL HALFTONING WITH SELECTIVELY APPLIED DOT-TO-DOT ERROR DIFFUSION

This invention relates to digital halftoning, combining the process of halftoning, or dithering, and error diffusion on a dot-to-dot basis.

BACKGROUND OF THE INVENTION

Image information, be it color, black or white, is commonly generated in a bitmap format where the bitmap comprises a plurality of gray level pixels, i.e. pixels that are defined by digital values, each value representing a gray level among a number of gray levels. Thus, in an 8 bit system, 256 levels of gray are present, where each level represents an increment of gray between black and white. In the case of color bitmaps, where three defining colors or separations each include 256 levels of information, there may be more than 16 million colors defined by a gray bitmap.

Usually, bitmaps in such a gray level format are unprintable by standard printers. Standard printers print in a limited number of levels, either a spot or a no spot in the binary case, or a limited number of levels associated with the spot, for example, four in the quaternary case. Accordingly, it is necessary to reduce the gray level image data to a limited number of levels so that it is printed. Besides gray level information derived by scanning, certain processing techniques such as those described, for example, in U.S. patent application Ser. No. 07/600,542 entitled "Method for Image Conversions With Error Diffusion", by R. Eschbach, produce gray level pixel values which require conversion to a limited set of "legal" or output values.

One standard method of converting gray level pixel image data to binary level pixel image data is through the use of dithering or halftoning processes. In such arrangements, over a given area having a number of gray pixels therein, each pixel of an array of gray level pixels within the area is compared to one of a set of preselected thresholds (the halftone cell). The effect of such an arrangement is that, for an area where the image is gray, some of the thresholds within the halftone cell will be exceeded, while others are not. In the binary case, the pixels or cell elements for which thresholds are exceeded are printed as white, while the remaining elements are allowed to remain black. The effect of the distribution of black and white over the cell is integrated by the human eye as gray. Dithering or halftoning presents problems, however, in that the amount of gray within an original image is not maintained over an area, i.e. the error arising from the difference between the threshold value and the actual gray level value at any particular cell is simply thrown away. This results in a loss of image information. In particular, dithering introduces coarse quantization artifacts which are visible in the image areas where the scene has little variation. This is also known as "banding".

Algorithms that convert gray images to binary or other number of level images attempting to preserve the local density exist, and include among them error diffusion, as taught, for example, in "An Adaptive Algorithm for Spatial Greyscale" by Floyd and Steinberg, Proceedings of the SID 17/2, 75-77 (1976) (hereinafter, "Floyd and Steinberg"). Another, more elaborate method would be the error diffusion techniques of U.S. patent application Ser. No. 07/396,272, entitled, "Edge Enhanced Error Diffusion Algorithm" by R. Eschbach and assigned to the same assignee as the present invention. Additional modifications to the error diffusion algorithm taught by Floyd and Steinberg have been proposed, e.g.: a different weighting matrix, as taught, for example, in "A Survey of Techniques for the Display of Continuous Tone Pictures on Bilevel Displays" by Jarvis et al., Computer Graphics and Images Processing, Vol. 5., pp. 13-40 (1976), and in "MECCA—A Multiple-Error Correction Computation Algorithm for Bi-Level Image Hardcopy Reproduction" by Stucki, IBM Res. Rep. RZ1060 (1981). Modifications of the error calculation and weight allocation have been taught, for example, in U.S. Pat. No. 4,924,322 to Kurosawa et. al., U.S. Pat. No. 4,339,774 to Temple, and U.S. Pat. No. 4,955,065, to Ulichney.

Error diffusion attempts to maintain gray by making the conversion from gray pixels to binary or other level pixels on pixel-by-pixel basis. The procedure examines each pixel with respect to a threshold, and the difference between the gray level pixel value and the output value is forwarded to a selected group or set of neighboring pixels, in accordance with a weighting scheme.

A problem noted with the use of the standard error diffusion algorithms is the production of large numbers of isolated pixels which are non-printable by many types of printers.

The introduction of a dot or dither pattern as a threshold for error diffusion was first suggested by Billotet-Hoffmann and Bryngdahl, Proceedings of the SID, Vol. 24/3, (1983), pp. 253-258. This was done to break up undesired patterns produced by the error diffusion algorithm.

SUMMARY OF THE INVENTION

In accordance with the invention, there is provided a method for quantizing gray level pixels using a combination of halftoning and error diffusion on a dot-to-dot basis.

In accordance with one aspect of the invention, there is provided a method of quantizing pixel values in an image formed by a plurality of pixels, each pixel representing an optical density of the image at a location within the image, and having an original optical density value selected from one of a set of 'c' original optical density values that has a number of members larger than a desired output set of 'd' optical density values through a process of halftoning and error diffusion. An image is processed in accordance with a halftone or dithering process. The resulting halftone dot is compared to a set of legal or full halftone dots, for a determination of whether the dot is a full or partial dot. Partial dots are directed to an output without further processing. For full dots, error occurring in the halftoning process is derived, by comparing the input gray level over the halftone cell, with the output halftone dot. Error derived from previous dot processing, is added to the error derivation, and the level of gray output is varied in accordance with a total error so derived. Error occurring in the output of the full dot is passed to a set of neighboring dots.

In accordance with another aspect of the invention, the local error derived at each dot, and a total error, derived over a plurality of previous dots, are each compared to reference values, to determine, irrespective of whether the dot was determined to be a full dot, whether the region of the image has appearance characteristics suggesting that halftoning without dot-to-dot error diffusion would produce satisfactory image quality in the quantization process.

Partial dots tend to occur at the edge or in busy areas of an image. Accordingly, at those points where partial dotting occurs, the image is relatively insensitive to coarse quantization artifacts. However, during the portion of the image where full dots are used, error diffusion is also used in conjunction with the halftoning process to produce smooth transitions, rather than the banding usually noted with halftoning.

In accordance with another aspect of the invention, a pattern matching technique for determining whether a dot is a partial dot or a full dot can be effectively used, where the gray level of that dot is known. Thus, the gray level defines what the pattern that should be appearing for the halftone cell is. If the image pattern does not match the predicted pattern for that gray level, then whatever that pattern is, it is known to be a partial dot.

In accordance with still another aspect of the invention, a method of quantizing pixel values in an image formed by a plurality of pixels, each pixel value representing an optical density of the image at a location therewithin, and having an pixel value selected from one of a set of 'c' original optical density values that has a number of members larger than a desired output set of 'd' optical density values, includes the steps: storing an array of pixel values representing an area of the image; thresholding the pixel values in said array in accordance with a halftone screen pattern, to derive output pixel values, the array representable as an output dot pattern; comparing the output dot pattern with a set of full dot patterns representing a set of incrementally varying gray levels, to determine whether the output dot pattern is a full dot pattern or a partial dot pattern; for a partial dot pattern is, directing said array of output pixel values to an output; for a full dot pattern, determining an error value that is a difference between a sum of pixel values in the array before thresholding, and a sum of pixel values in the array thereafter; adding a remainder error stored in a remainder buffer, from previous arrays of pixel values, to the error value to derive a total error; comparing the total error with a reference, to determine whether to vary the output pattern; varying by a preselected increment, the full dot output pattern in response to said comparison; determining the difference between the total error and the preselected incremental value, and storing said difference as a remainder error in the remainder buffer; and directing the array of output pixel values forming the varied full dot output pattern, to an output.

These and other aspects of the invention will become apparent from the following descriptions to illustrate a preferred embodiment of the invention read in conjunction with the accompanying drawings in which:

FIG. 6A is an example of the process, and FIG. 6B is an example halftone screen.

Figure 1:
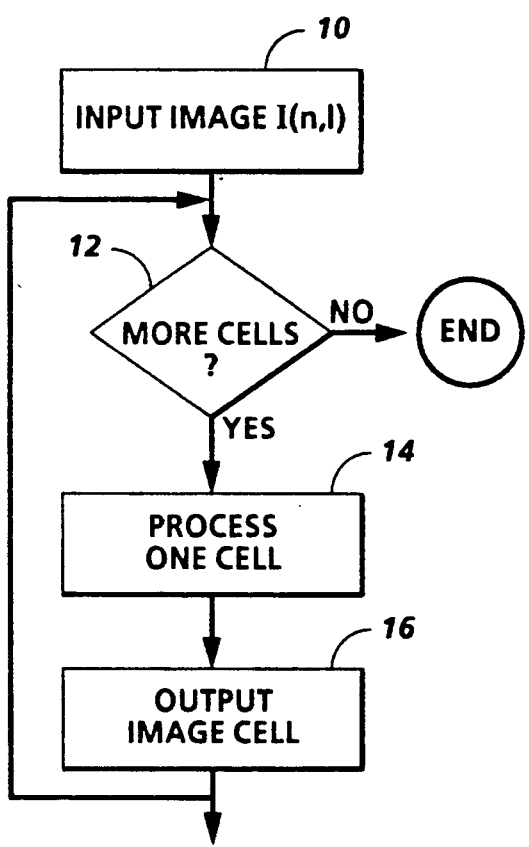
FIG. 1 is a flow chart showing the basic process of the present invention.

Referring now to the drawings where the showings are for the purpose of describing a preferred embodiment of the invention and not for limiting the same, FIG. 1 shows a flow chart describing the steps of the present inventive process for processing an image I(n,l). Image I(n,l) is comprised of n pixels arranged in l scan lines, each pixel having a value that is a member of a set of "c" values which is larger than desired for output purposes. The number of members "c" is determined by the number of gray levels over which the pixel may be defined, which often corresponds to the number of bits that may form the digital representation of the gray level. Thus, if each bit is defined by an n-bit gray level value, the bit, "c" may be one of $2^n$ values. Alternatively, the pixel may initially have an analog value, that may be converted to a multi bit digital value, as required by an analog-to-digital converter. At block 10, an input image I(n,l) is directed through a decision step 12 which determines whether further halftone cells are to be processed. If no further halftone cells are to be processed, the process ends. If further blocks are to be processed, the cells are processed at processing step 14. At step 16, the processed cell is directed to an output. Subsequent to process step 16, the process refers back to the decision step 12. As used herein, "halftone cell" or "cell" refers to the area over which a dither matrix is applied. The processed output is sometimes referred to as a "dot", which is made up of a plurality of pixels. Each position or cell element in the halftone cell processes one pixel. The process of halftoning, or dithering is well known, as are a number of different dithering methods and cells. The actual dithering or halftoning process selected is not critical, and will accordingly be given only a limited explanation herein. The output of the halftone cell is a set or array of pixels that have a value that is a member of a set of output or legal values having "d" members, where "d" is usually determined by the number of output states available at the output device.

Figure 2:
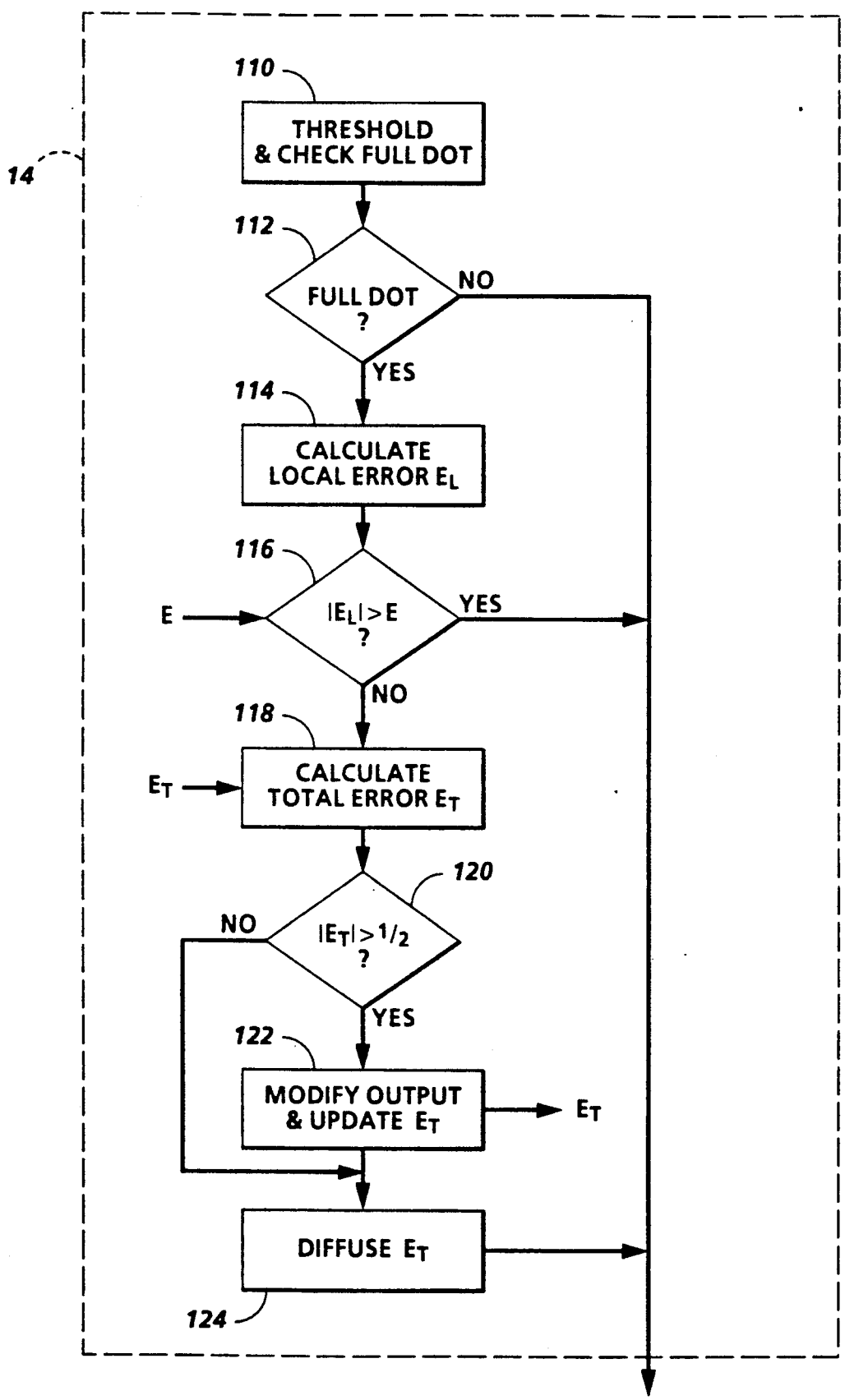
FIG. 2 is a flow chart showing the inventive process of the present invention.
Figure 4B:
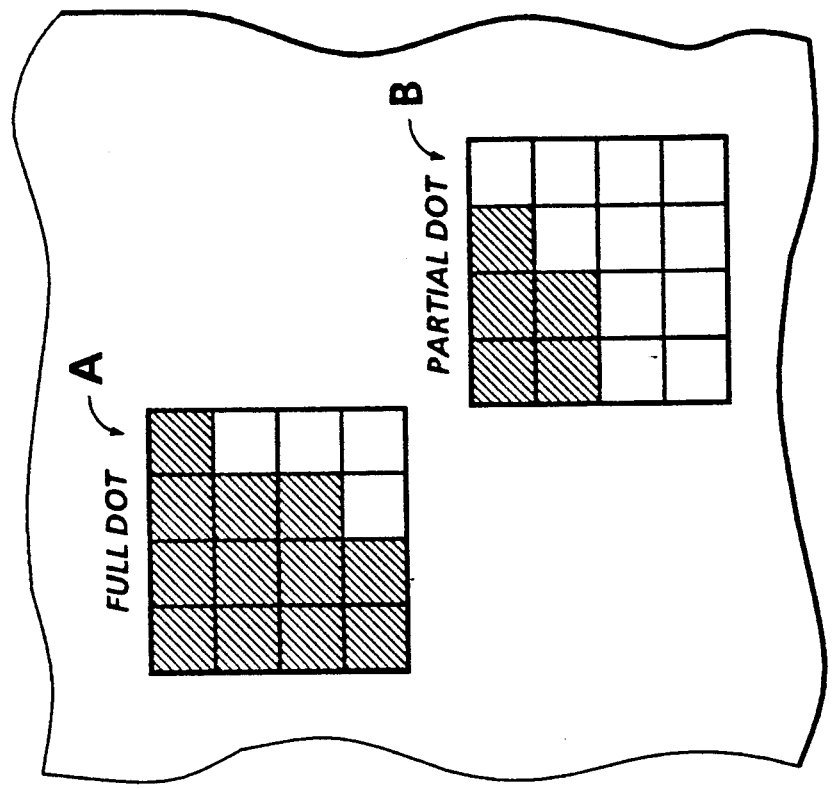
FIGS. 4A and 4B are illustrations of the process at the pixel level.
Figure 4A:
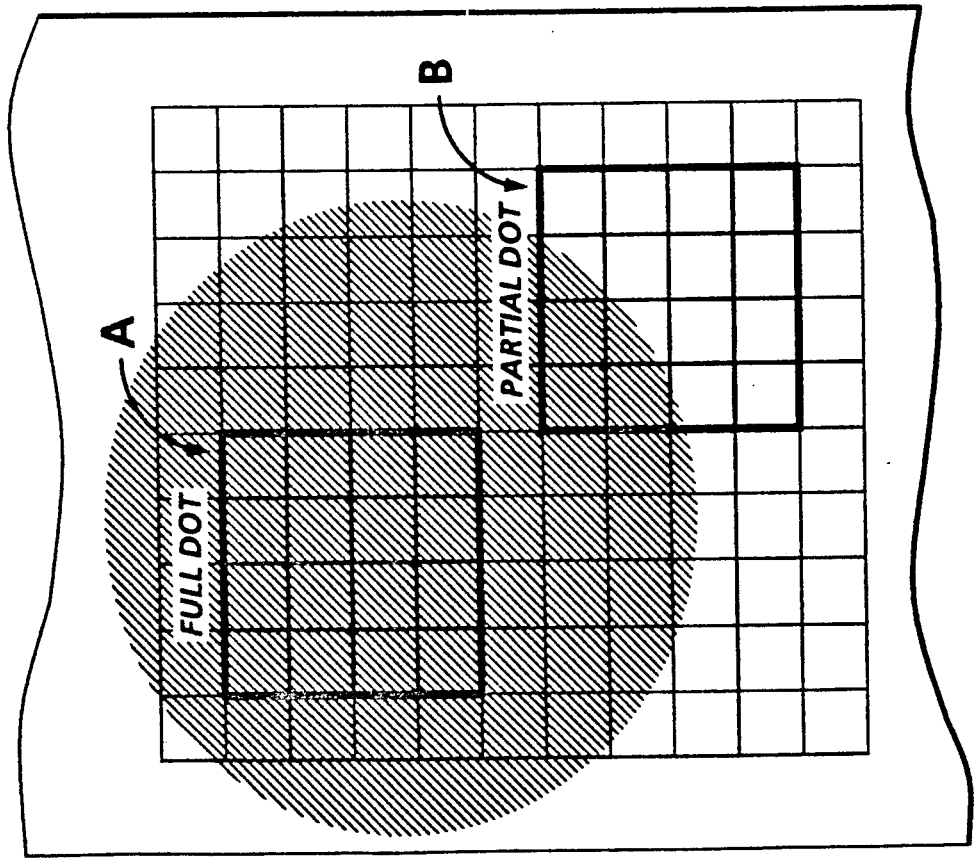
Figure 5:
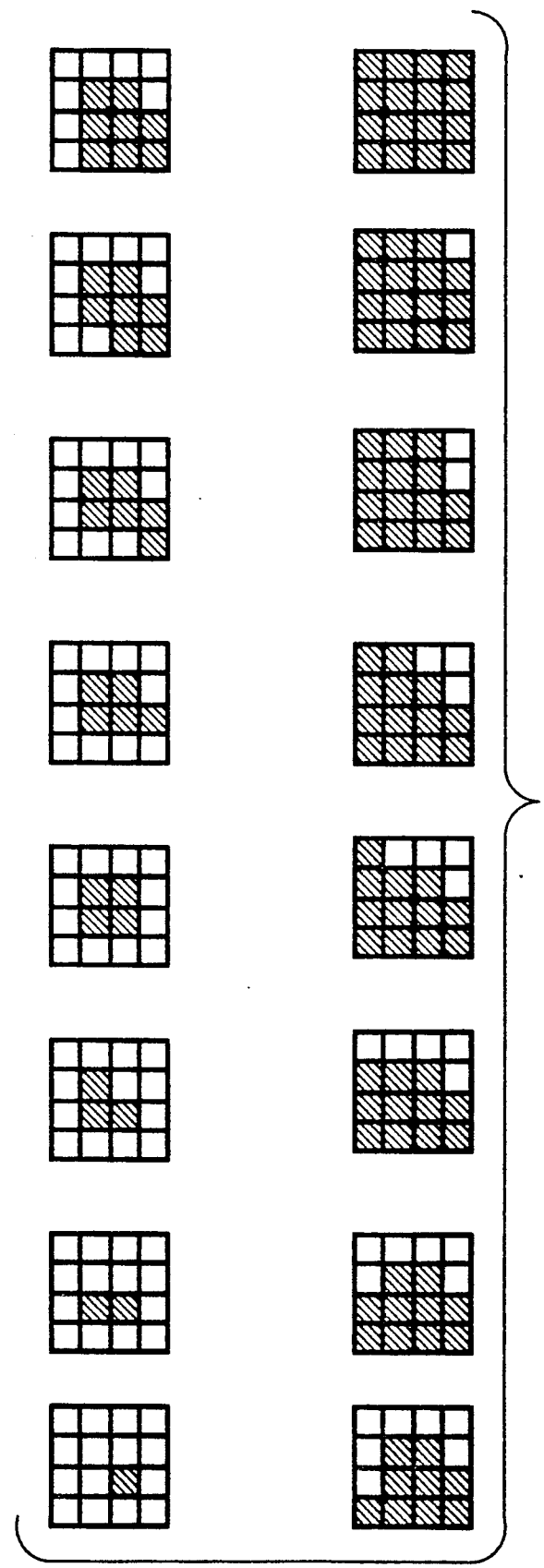
FIG. 5 is an example set of full dots for the screen of FIG. 4B.

With reference now to FIG. 2, step 14 includes the steps shown in the flow chart therein. At a first step 110, each pixel is thresholded against an appropriate threshold level established by the halftone cell used. At that step, or immediately therefollowing, at step 112, an examination is made of the dot in which the pixel is located to determine whether or not that dot is a full dot or a partial dot. A partial dot is the result of a halftoning process over an area at an edge or boundary in image, where an edge or boundary might be defined as an abrupt change in the gray level of the image. A partial dot reflects that abruptness, such that a portion of the dot is at one gray level, while another portion of the dot is at a second gray level. One particularly notable characteristic, is that, for a given dither matrix, the thresholding operation is inconsistent across the cell area, e.g., at one pixel in the cell, a high level threshold is exceeded, while at another pixel in the cell a low level threshold is not exceeded. Thus, the partial dot may be detected as pattern which is not equal to one of a set of predetermined patterns that reflect a fairly uniform gray level. Since there is no uniform gray level over the dot, the dot may be treated as two gray levels accordingly. Thus, with reference to FIG. 4A, a first matrix A is located entirely within a uniform gray area. A second matrix B is located over a non-uniform gray area, including an edge. The halftone process results, or the halftone dot produced for each, are shown isolated from the image in FIG. 4B. FIG. 5 shows an simple halftone matrix output, or full dot set, resulting from the set of values arranged as shown in FIG. 6B, where it is assumed that value 1-16 represent thresholds selected to produce an output between all black and all white. Comparing the pattern of the output B illustrated in FIG. 4B to the halftone output set of FIG. 5A shows that output B is not a member of the set, and therefore is a partial dot. Output A, however, is a member of the halftone matrix output set of FIG. 5, and therefore is a full dot.

If the dot is a partial dot, that portion of the image is simply passed to an output. If, however, the dot is a full dot, the local error $E_L$, i.e., the error value that occurs over the entire dot is calculated. At step 116, the absolute value of the local error (it will no doubt be appreciated the error may be either positive or negative, in accordance with the way that error is determined), is determined to see whether or not it is greater than a certain reference value E. If the absolute value of local error $E_L$ is greater than this reference value, no further processing of that particular dot is made. E is selected such that a large E tends to indicate a very busy, rapidly changing image. Accordingly, in such portions of an image, dithering alone is acceptable, and accordingly, there is no need for further error processing of the pixel.

Assuming that the absolute value of local error $E_L$ is not greater than reference E, next step 118 calculates the total error $E_T$. Total error $E_T$ is equal to local error $E_L$ plus a remainder error passed from an remainder error buffer which stores error accruing in one dot line. As used herein, a dot line refers to a line of dots or halftone cells. At step 120, the absolute value of the total error $E_T$ is compared to reference value to determine whether or not it is greater than a value which is selected to determine whether or not the total error $E_T$ is correctable. If total error $E_T$ is too small to be correctable, it is diffused to the neighboring dots at step 124. At step 122, if total error $E_T$ is within reasonable limits, however, the output dot is modified by incrementing output dot pattern produced in the halftoning process by one gray level, and total error is updated in accordance with the updating of the error. Then, at step 124, the total error remaining is diffused to neighboring dots.

Figure 3:
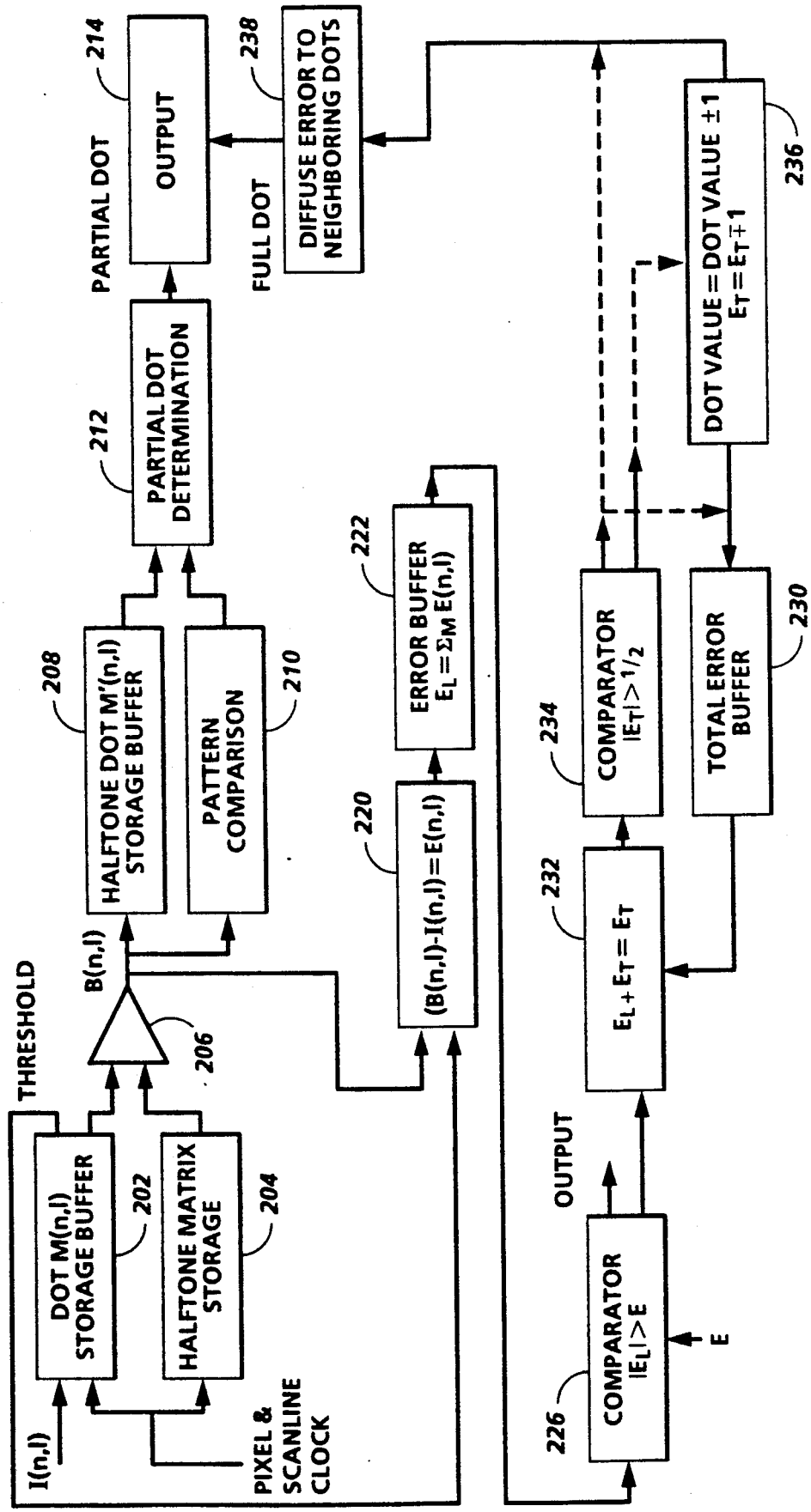
FIG. 3 is a block diagram showing a system in which the present invention may find use.

With reference now to FIG. 3, a generalized system description is provided in block diagram form. Referring to the upper left hand corner of FIG. 3, an image I(n,l), defined at "c" levels, is directed to a dot storage buffer 202, where dot M(n,l) is stored. A dot is defined as a grouping of pixels which will be processed by a single halftone matrix. When printed, a full dot will appear as a dot in the formation of gray level images for image I(n,l). Storage buffer 202 is also provided with information from a pixel clock and scan line lock (shown as a single line) to determine how it should store I(n,l) within storage buffer 202. Information about the halftone cell thresholds, or the thresholds, is stored in a halftone matrix storage device 204. The halftone matrix storage device 204 may be loaded with a single set of threshold values or multiple set of threshold values, or may be reloaded from an exterior source, in accordance with many well known procedures. Halftone matrix storage device 204 is also provided with information from a pixel clock and scan line lock (shown as a single line), in order to provide the correct threshold for a position in the cell to the thresholding step. Each pixel stored in dot storage buffer 202 is thresholded with a corresponding threshold value stored in the halftone matrix storage device 204, at threshold device 206. The output is a single legal output value representing that pixel, which will be reproduced on a printer, display screen or other output device. In a binary printer, such a value would be zero or 1 (no spot or spot). Of course, in a quaternary printer or other printer the number or values of legal outputs may be different. However, whatever the value, a legal value is one of the possible values that may be output by an output device. The image, now reduced to a limited set of "d" output or legal values, which can now be referred to as B(n,l) is stored at halftone dot M'(n,l) storage buffer 208. The halftone dot is stored in this buffer so that the pattern of the dot, defined by set of output value derived in the halftone process may be compared to a set of patterns stored in a memory to determine whether or not the halftone dot is a partial dot or a full dot. A pattern comparison device or process is provided, which accomplished the process of (1) determining which of a preselected set of dot patterns (e.g., the set in FIG. 5A) that a dot having a particular gray level should be, and (2) comparing the dot pattern with the actual dot to determine whether or not the actual dot corresponds to a legal pattern. If the actual dot does not correspond to a legal pattern, then a determination is made indicating that the dot is a partial dot and not a full dot. That determination is directed to partial dot determination 212. The output of partial dot determination 212 is a signal that a partial dot is directed to output 214. In all other cases, a full dot is directed to output 214 in accordance with the description that will follow.

Referring back again to threshold device 206, the output of the threshold is also directed to an error determination block 220. That error determination block is a differencing function, having inputs B(n,l) and I(n,l), so that the error determination, the difference between the input image and the output image, is made of a pixel-by-pixel error determination. At error buffer 222, a local error determination is made, which is the sum of pixel errors E(n,l) in the halftone cell M. The absolute value of the local area error $E_L$ is then compared at comparator 226 to a reference error E, to determine whether or not local error $E_L$ is larger than this reference error. If local error $E_L$ is larger than the reference error, partial dot determination is selected and the dot is treated as a partial dot and directed to output 214. Alternatively, local error $E_L$ could be clipped by some value if it is larger than E.

If local error $E_L$ is not larger than the reference error, a previously determined total error $E_T$, stored in a total error buffer 230 is added to local error $E_L$ at adder 232 to determine a new total error. The absolute value of total error $E_T$ is compared to a second reference value ($\frac{1}{2}$) at comparator 234 to determine whether to compensate for error within the image. If the absolute value of total error $E_T$ is greater than the reference value, then at block 236, the dot value is modified to be the dot value ±1 (depending on the error) and total error $E_T$ is modified by ∓1 (depending on the dot value variation). In other words, total error $E_T$ is set equal to the difference between the total error $E_T$ and the increment by which the dot is varied. The dot value in this sense is the selected pattern for a gray level, incremented or decremented to the next gray level. If the absolute value of total error $E_T$ is not larger than $\frac{1}{2}$, the error will not be compensated. Then, the total error $E_T$ is diffused at block 238 to neighboring dots predetermined in accordance with the pattern of distribution, such as, perhaps, the next dot in the dot line, or all there heretofore unprocessed neighbors, etc.

With reference now to FIGS. 6A and 6B, the invention can be seen in an example. With reference to FIG. 6A, supposing a gray portion of the image has as an example gray level value 136/256, while the remainder of the image has a value of 256/256. Selecting an appropriate halftone pattern for cell A, a pattern which accurately represents a gray level value of 128/256 is selected. According to the halftone screen of FIG. 6B, eight pixels are rendered black. Summing up the input value in the cell as 8.5, and taking the output value as 8, local error $E_L$ is 0.5, which could be said to be no larger than the reference value E (E is set to 0.5 for this example). Assuming that total error $E_T$ is initially 0, the sum of $E_L$ and $E_T$ is then 0.5. Accordingly, in this example there is no need to change the output dither pattern. In cell B, a pattern 128/256 which again accurately represents the gray level value of 136/256 is selected. According to the halftone screen of FIG. 6B, eight pixels are rendered black. Summing up the input value in the cell as 8.5, and taking the output value as 8, local error $E_L$ is 0.5, which could be said to be no larger than the reference E. Now, the original total error is 0.5, and the sum of $E_L$ and $E_T$ is then 1.0. Therefore, the dither pattern of cell B is modified to reflect an increased gray level value of 9 pixels. Since the entire error term was used by the function L+1, total error $E_T$ is modified to be 0. Next cell C, however, is only a partial dot. No error is derived from the partial dot. In the particular case, no error is passed to cell C.

It will no doubt be appreciated that the described method has alternative descriptions. In one such description, error might be determined for every dot, on a pixel by pixel by pixel basis. In such cases, error derived at partial dots may be ignored, while at full dots, error is processed to maintain gray over an area of the image.

The invention has been described with reference to a particular embodiment. Modifications and alterations will occur to others upon reading and understanding this specification. It is intended that all such modifications and alterations are included insofar as they come within the scope of the appended claims or equivalents thereof.

I claim:

1. A method of quantizing pixel values in an image formed by a plurality of pixels, each pixel value representing an optical density of the image at a location therewithin, and having a pixel value selected from one of a set of 'c' original optical density values that has a number of members larger than a desired output set of 'd' optical density values, including the steps:

storing an array of pixel values representing an area of the image;
   thresholding the pixel values in said array in accordance with a halftone screen pattern, to derive output pixel values, the array representable as an output dot pattern;
   comparing the output dot pattern with a set of full dot patterns representing a set of incrementally varying gray levels, to determine whether the output dot pattern is a full dot pattern or a partial dot pattern;
   for a partial dot pattern, directing said array of output pixel values to an output;
   for a full dot pattern, determining an error value that is a difference between a sum of pixel values in the array before thresholding, and a sum of pixel values in the array thereafter;
   adding a remainder error stored in a remainder buffer, from previous arrays of pixel values, to the error value to derive a total error;
   comparing the total error with a reference, to determine whether to vary the output pattern;
   varying by a preselected increment, the full dot output pattern in response to said comparison;
   determining the difference between the total error and the preselected incremental value, and storing said difference as a remainder error in the remainder buffer; and
   directing the array of output pixel values forming the varied full dot output pattern, to an output.

2. The method as described in claim 1, including the step of identifying as partial dot patterns arrays of pixels in which the error value exceeds an error reference.

3. The method as described in claim 1, including the step of identifying as partial dot patterns arrays of pixels in which the error value does not exceed the reference.

4. The method described in claim 1, wherein upon determining that the total error does not exceed a reference, setting said preselected increment to 0.

5. A method of quantizing pixel values in an image formed by a plurality of pixels, each pixel value representing an optical density of the image at a location therewithin, and having a pixel value selected from one of a set of 'c' original optical density values that has a number of members larger than a desired output set of 'd' optical density values, including the steps:

storing an array of pixel values representing an area of the image;
   thresholding the pixel values in said array in accordance with a halftone screen pattern, to derive output pixel values, the array representable as an output dot pattern;
   determining an error value that is a difference between a sum of pixel values in the array before thresholding, and a sum of pixel values in the array thereafter;
   comparing the output dot pattern with a set of full dot patterns representing a set of incrementally varying gray levels, to determine whether the output dot pattern is a full dot pattern or a partial dot pattern;
   for a partial dot pattern, discarding the error value and directing the array of pixels forming the partial dot to an output;
   for a full dot pattern, adding a remainder error stored in a remainder buffer, from previous arrays of pixel values, to the error value to derive a total error;
   comparing the total error with a reference, to determine whether to vary the output pattern;
   varying by a preselected increment, the full dot output pattern in response to said comparison;
   directing the array of output pixel values forming the varied full dot output pattern, to an output.

6. The method as described in claim 5, including the step of identifying as partial dot patterns arrays of pixels in which the error value exceeds an error reference.

7. The method as described in claim 5, including the step of identifying as partial dot patterns arrays of pixels in which the error value does not exceed the reference.

8. The method as described in claim 5, wherein upon determining that the total error does not exceed a reference, setting said preselected increment to 0.

* * * * *